United States Patent
Singh et al.

(10) Patent No.: US 12,314,431 B2
(45) Date of Patent: May 27, 2025

(54) SYSTEM AND METHOD FOR ASSESSMENT OF PRIVACY EXPOSURE AND COMPUTING RISK INDEX FOR ONLINE SERVICE

(71) Applicant: McAfee, LLC, San Jose, CA (US)

(72) Inventors: Ram Sharan Singh, Bangalore (IN); Srikanth Nalluri, Karnataka (IN); Dattatraya Kulkarni, Bangalore (IN)

(73) Assignee: McAfee, LLC, San Jose, CA (US)

( * ) Notice: Subject to any disclaimer, the term of this patent is extended or adjusted under 35 U.S.C. 154(b) by 205 days.

(21) Appl. No.: 17/900,263

(22) Filed: Aug. 31, 2022

(65) Prior Publication Data
US 2024/0070313 A1    Feb. 29, 2024

(51) Int. Cl.
G06F 21/62    (2013.01)
G06F 9/50    (2006.01)
H04W 12/02    (2009.01)

(52) U.S. Cl.
CPC .................. *G06F 21/6245* (2013.01)

(58) Field of Classification Search
CPC .................................................. G06F 21/6245
See application file for complete search history.

(56) References Cited

U.S. PATENT DOCUMENTS

| | | | |
|---|---|---|---|
| 12,155,781 B1* | 11/2024 | Helfgott | G06F 21/6218 |
| 2004/0193870 A1 | 9/2004 | Redlich et al. | |
| 2010/0257577 A1 | 10/2010 | Grandison et al. | |
| 2021/0150056 A1* | 5/2021 | Vax | G06F 16/285 |
| 2022/0270008 A1* | 8/2022 | Milden | G06Q 10/0635 |
| 2022/0286438 A1 | 9/2022 | Burke, Jr. et al. | |
| 2022/0327541 A1* | 10/2022 | Seguritan | G06Q 20/4016 |
| 2023/0120348 A1 | 4/2023 | Rosado | |
| 2024/0070314 A1 | 2/2024 | Singh et al. | |

FOREIGN PATENT DOCUMENTS

WO    WO-2017111967 A1 *    6/2017    ......... G06F 21/6245

OTHER PUBLICATIONS

Paulo Silva, Edmundo Monteiro, Paulo Simões, Privacy in the Cloud: A Survey of Existing Solutions and Research Challenges; IEEE Access; Year: Jan. 6, 2021; vol. 9; Journal Article; Publisher: IEEE; pp. 10473-10497 (Year: 2021).*

"Mccallister, Erika, et al.," Guide to Protecting the Confidentiality of Personally Identifiable Information (PII) (Draft). NIST Special Publication 800-122, Jan. 2009 (Year: 2009); 58 pgs.

* cited by examiner

*Primary Examiner* — Fatoumata Traore
*Assistant Examiner* — Courtney D Fields
(74) *Attorney, Agent, or Firm* — Patent Capital Group

(57) ABSTRACT

A method includes receiving privacy information about an entity from a privacy resource; parsing the privacy information to identify a plurality of keywords; determining a plurality of attributes of a user requested by the entity, at least in part based on the plurality of keywords; and transmitting a result, at least in part based on the plurality of attributes.

17 Claims, 10 Drawing Sheets

SYSTEM AND METHOD FOR ASSESSMENT OF PRIVACY EXPOSURE AND COMPUTING RISK INDEX FOR ONLINE SERVICE

BACKGROUND

Technical Field

This disclosure relates to computer networks and, in particular, to assessing potential privacy exposure by sharing personal information.

Related Art

Users increasingly use online services (e.g., websites and applications) for cost and/or convenience benefits in obtaining goods and/or services. Digital privacy and/or identity exposure occurs when users interact with these online services via a browser, a mobile app, or various direct or indirect channels.

Entities (e.g., companies, charities, non-governmental organizations, and online services) collect extensive private and sensitive information about the users during their interactions with the websites and/or applications of the entities. Subsequently, these entities control, process, and archive users' personally identifiable information (PII) based on the nature of the entities' businesses. Thus, the entities can use the private and/or sensitive information either for a current interaction or a future business need.

Once shared with the service, the users' private information can be accessed by third parties, due to weak data security, software flaws, or misuse by the entity selling or sharing the data for monetization.

Even if an entity is conscientious at the time the data is shared, the entity might not be as conscientious at a later time. For example, ownership and/or management of the entity might change over time. Thus, the users' PII remains at risk for as long as the data is retained by the entity.

BRIEF SUMMARY

A method includes a receiving privacy information about an entity from a privacy resource; parsing the privacy information to identify a plurality of keywords; determining a plurality of attributes of a user requested by the entity, at least in part based on the plurality of keywords; and transmitting a result, at least in part based on the plurality of attributes.

DETAILED DESCRIPTION

For purposes of illustrating the present innovation, it might be useful to understand phenomena relevant to various implementations of the disclosure. The following foundational information can be viewed as a basis from which the present disclosure can be explained. Such information is offered for purposes of explanation only and, accordingly, should not be construed to limit the scope of the present disclosure and its potential applications.

Currently, users are unable to get a clear and comprehensive account of the data exposure risk they face when they use an online service provided by an entity. For example, privacy policies of the entities are often written in highly technical legal language that ordinary users do not spend time to read nor readily understand. Accordingly, the users are often unaware of the magnitude of the information collected or the privacy exposure risk they face. There is no solution available today that provides to a user a privacy exposure depth and index score for a given digital entity.

Figure 1:
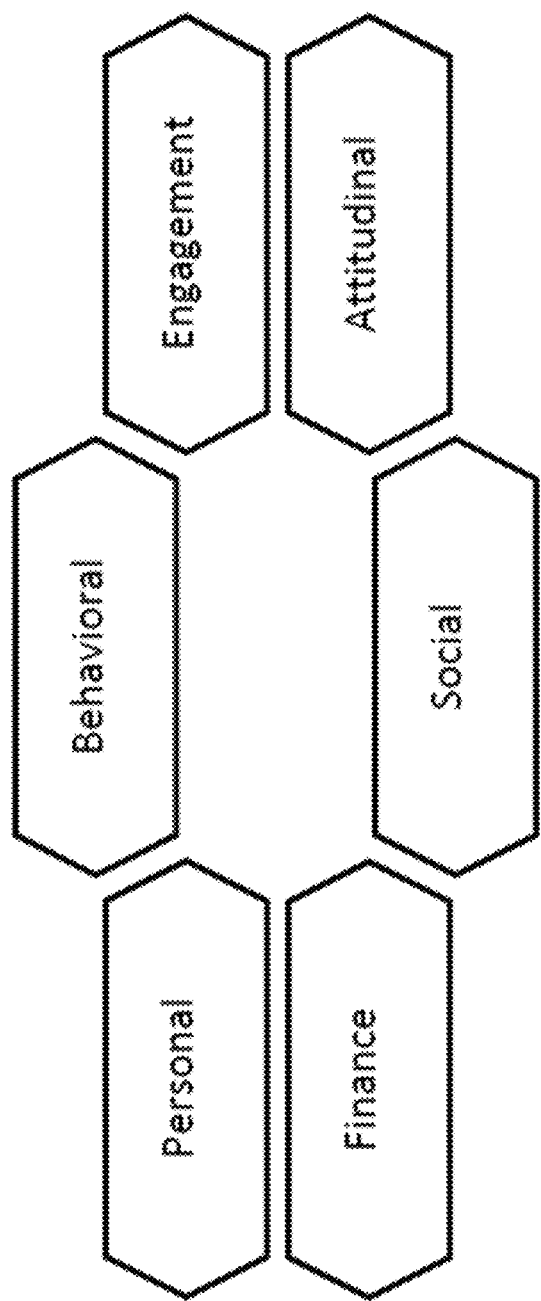
FIG. 1 depicts some groups of information collected by entities.

FIG. 1 depicts some groups of information that can be collected by entities in various implementations of the present disclosure. The depicted groups include personal information, behavioral information, engagement information, finance information, social information, and attitudinal information. The groups of information collected by entities are not limited to those depicted in FIG. 1.

Although FIG. 1 depicts these groups as separate, the groups of information can overlap. That is, a particular piece of information can belong to multiple groups. For example, a click on social media can be both engagement and social. Further, different aspects of a single piece of information can belong to different groups, especially as the piece of information is framed in different contexts. For example, a user's net worth can include both finance and attitudinal information.

Personal information of a user pertains to the identity of the user themselves. Examples of personal information include a name of the user, an email address used by the user, and a telephone or other contact number used by the user.

Behavioral information of the user concerns how the user behaves, relative to electronic devices. Examples of behavioral information can include an identification of an application on an electronic device used by the user, an identification of a sensor (e.g., camera or microphone) on the electronic device, or a mode of communication (e.g., text message or voice message) used by the user on the electronic device.

Engagement information concerns how a user interacts with particular digital content, such as bookmarking content, engaging with advertisements, liking or favoriting posts, reposting another user's content, taking polls, and establishing connections with other users.

Finance information concerns financial institutions with which the user interacts. For example, finance information can include a name of a bank with which the user has an account, an account number of the user at the bank, an expiry of the card, a debit card number that access the account at the bank, and a card verification value (CVV) printed on the debit card. CVVs are also known as card security codes (CSCs), card verification codes (CVCs), or card identification numbers (CIDs). Further, although this explanation has been provided in the context of a debit card, finance information can also encompass credit cards, as well as prepaid cards or cryptocurrencies. Finance information also can concern stocks, bonds, mutual funds, and/or derivatives held by the user. Further, finance information can concern debts owed by the user, such as mortgages, car loans, student debt, credit card debt, liens, and family support payments.

Social information concerns social entities, such as friends, social circles, and groups, with whom the user socially interacts. This information can be drawn from a contacts list hosted locally on a user's electronic device, such as a computer or smartphone. The information can also be drawn from a contacts list hosted remotely, such as in a cloud resource. Examples of such contacts lists are Google Contacts and Outlook Contacts. This information also can be drawn from social networks, like Facebook, Twitter, LinkedIn, or TikTok. This information can also be drawn from dedicated messaging applications, such as Snapchat and WhatsApp.

Attitudinal information concerns experiences of the user. For example, attitudinal information can concern the life stage of the user, such as minor, college, married, parent, and retiree. Attitudinal information can also concern past incidents in the user's life, such as a criminal record.

The information illustrated in FIG. 1 can be collected by an entity and be vulnerable to exposure to a third party. Thus, various implementations according to this disclosure include a mechanism to assess the privacy exposure and associated risk from a user interacting with the entity. This mechanism can be based on entity information, such as a domain name, a Uniform Resource Locator (URL), or a package ID of an app of the online service. Select implementations can inform the user of this exposure and risk in a simple, intelligible, and actionable way.

Figure 2:
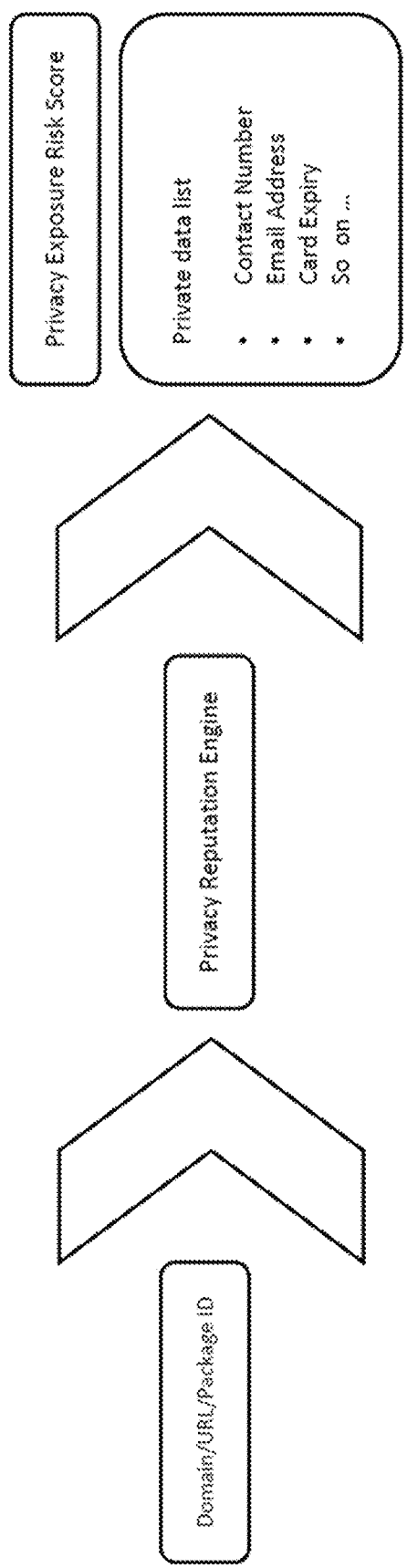
FIG. 2 depicts a conceptual flow of a system, according to an implementation of the present disclosure.

FIG. 2 depicts a conceptual flow of the system, according to various implementations of the present disclosure. As illustrated in FIG. 2, the system begins with the identification of an entity, such as via a domain or URL of an entity. The identification of the entity also can be an ID of a package, such as an application operated by or on behalf of the entity. The identity of the entity is provided to a privacy reputation engine.

The privacy reputation engine receives the identification of the entity and can generate a privacy exposure risk score for the entity, based on the identification. In addition, the privacy reputation engine can generate a list of private data requested by the entity, such as a user's contact number, email address, card expiry, and so on. In some implementations, the privacy reputation engine can transmit a remediation of the privacy exposure.

Figure 3:
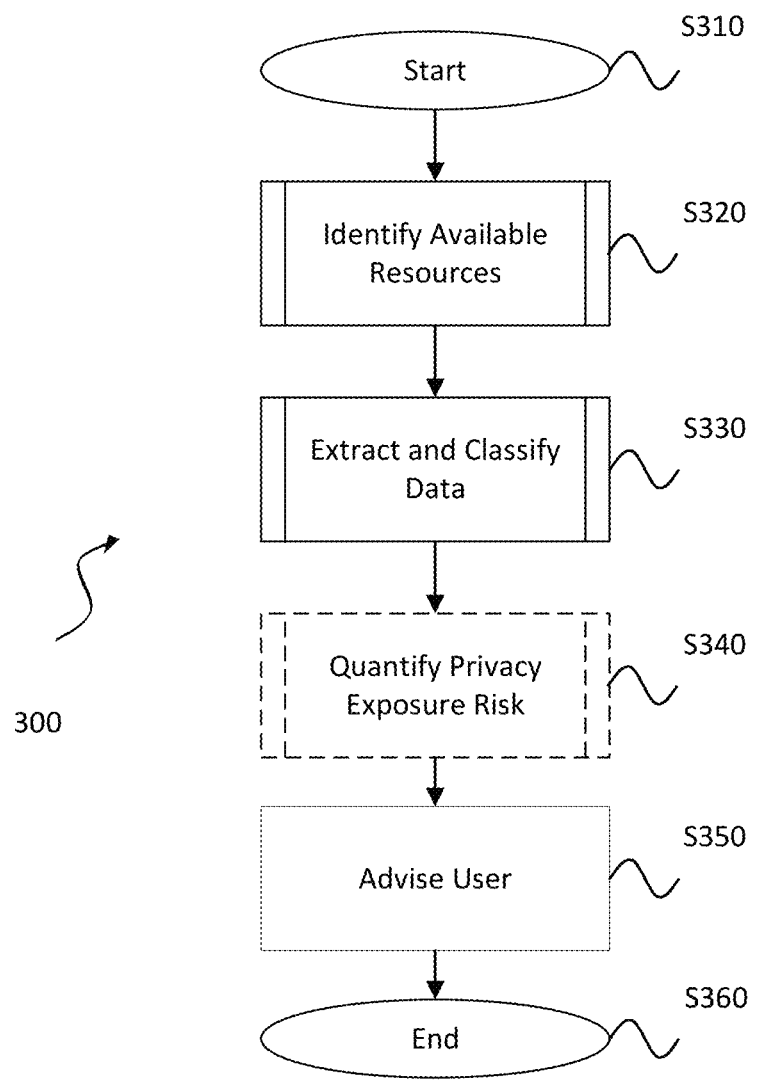
FIG. 3 depicts an algorithm for a high-level flow of the system, according to one implementation of the present disclosure.

FIG. 3 depicts an algorithm 300 for a high-level flow of the system, according to various implementations of the present disclosure. The algorithm 300 begins at S310 and advances to S320. In S320, the system can identify resources from which the system can collect evidence of the personal data collected by the entity. These resources can form diverse and complementary sets of evidence, such as direct and/or indirect evidence. Examples of resources are a privacy policy and an app store.

In S330, the system can extract, from those resources, information about the collected private data. That is, the system receives and compiles the privacy exposure information from the diverse sources identified in S320.

Direct evidence typically can provide information regarding the quantity, the frequency, and/or the depth of the personal data collected by the entity. Some examples of direct evidence include privacy policies of the entity (including, but not limited to, a privacy policy for a website of the entity), the terms and conditions of use associated with the entity and its services, and regulatory compliance documents (such as for state corporation commissions and the US Securities and Exchange Commission). In some implementations, the system includes a scanner to scan these sources of direct evidence.

The system can retrieve direct evidence from an app store, such as the Apple App Store, the Google Play Store, the Amazon AppStore, and the Microsoft Store. Such evidence can include the manifest and the declaration of permissions of an application of the entity, a description of the application, and data safety information. For example, the Apple App Store has an App Privacy section, and the Google Play Store includes a data safety section.

In addition, an operating system (OS) of a device or the application itself can make such evidence available upon installation of the application. For example, some applications request permission to access particular resources (e.g., sensors, storage, communication mediums) of the device on which they are installed, either at the time of installation or at the time the application checks for permission to access that resource.

Indirect evidence typically can provide information regarding the nature of the business of the entity, a data exchange during communication with the entity, and components of a business that define a classification of a service of the entity. For example, the indirect evidence can include the behavior of an application, such as its use of sensors, or the behavior of communications associated with the entity.

The system can obtain another form of indirect evidence by scanning the local environments and/or platforms of a device on which a user interacts with the service. Examples of such environments/platforms include a personal computer, a smartphone, or a tablet computer, a web browser, or an application. These environments/platforms are not limited to hardware environments/platforms and can include software environments/platforms as well, such as operating systems or application suites.

Indirect evidence also can include metadata. Sources of metadata can be diverse, and the particular metadata available from a source can be context-specific. Thus, the term "metadata" can be construed broadly. Some examples of metadata can include, for example, a service category of the entity and a legal jurisdiction for the entity.

For example, for the cases of a privacy policy, a manifest, a description about an application, and a data safety/app privacy section, the system downloads the contents of those resources. For the cases of data logs or browser-stored databases (e.g., logins, passwords, contents of previously filled-in forms, credit card numbers), the system extracts the contents of those resources. Some implementations of the system can perform privacy policy scanning, application manifest scanning, form-fill scanning (e.g., scanning forms received in a webpage), browser database scanning, and/or log scanning.

Thus, select implementations can extract exposure information indicating the users' private and sensitive information collected by the entity. As discussed later, for example, the system can extract verb and phrase patterns from the downloaded and/or extracted contents. For the cases of a privacy policy, a manifest, a description about an application, and a data safety/app privacy section, the system can extract a part of speech for each statement. The system then can filter statements with valid verbs and/or phrases and subsequently classify the private data by type and sensitivity. This filtering can be based on both the extracted part of speech and the extracted verbs and phrases.

Thus, the system can generate, based on the results of the filtering, a common schema for representing the privacy exposure data and its attributes. Thus, some implementations can determine the extent of a user's privacy exposure.

Subsequently, in S340, the system can quantify a privacy exposure risk, such as by a scoring scheme, based on the resources and classifications of the private data.

The system optionally can determine an index indicative of the user's exposure risk, based on the type and sensitivity of the information collected by the entity. Thus, various implementations can provide a consolidated view of exposure and risk.

In S350, the system can advise a user of the privacy exposure risk and/or a remediation of the risk. For example, the system and method can transmit (i) the types of information collected by the online entity and/or (ii) an exposure index that quantifies the privacy exposure risk based on the sensitivity of the collected information. The remediation can include recommendations, such as canceling a debit card or a bank card or changing a password.

The algorithm 300 ends at S360.

Figure 4:
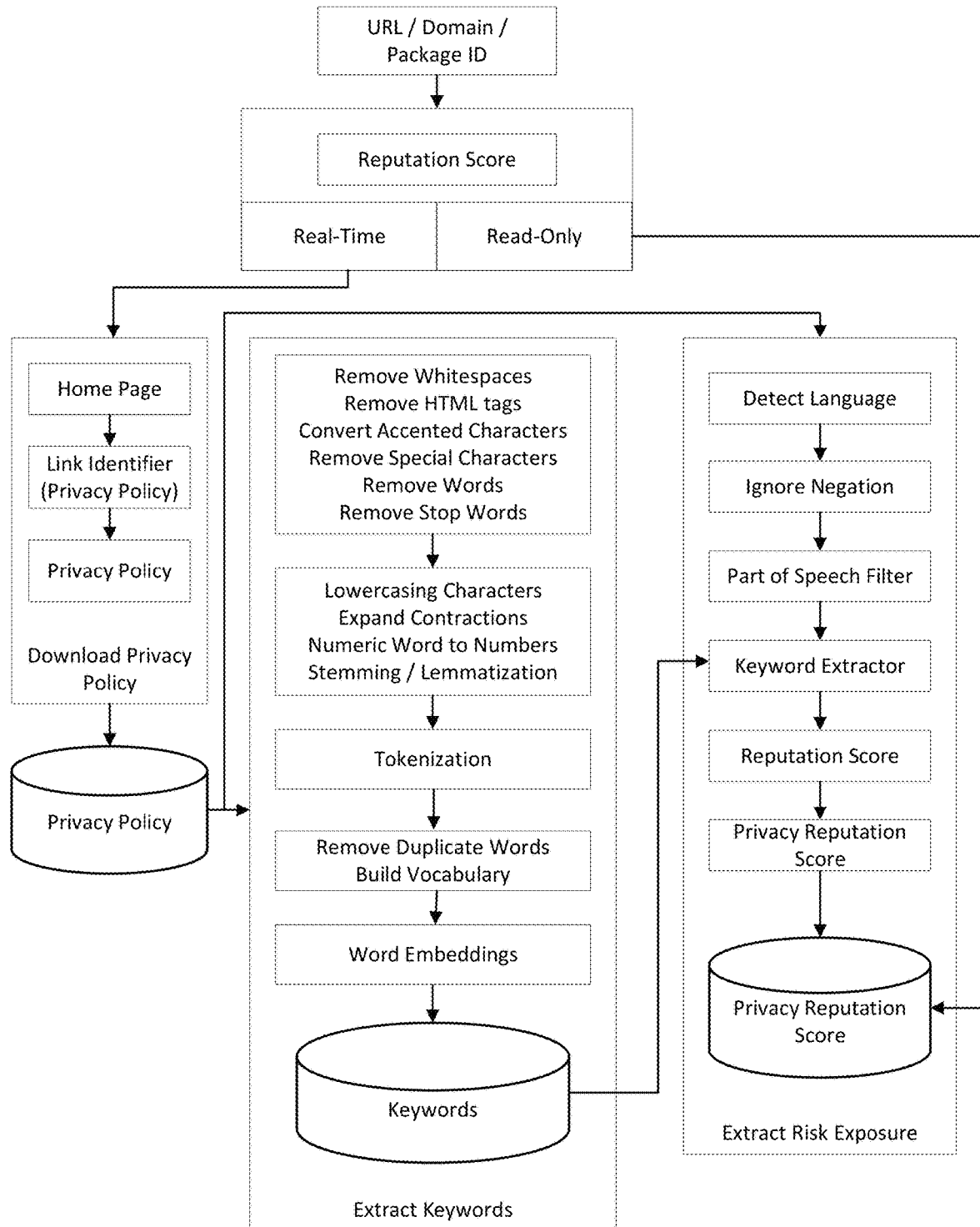
FIG. 4 depicts an algorithm for a detailed linguistic flow of the system, according to various implementations of the present disclosure.

FIG. 4 depicts an algorithm for a detailed linguistic flow of the system, according to one implementation of the present disclosure.

As illustrated in FIG. 4, the system receives an input of a URL, a domain, or a package ID that identifies an entity. The system can retrieve a reputation score of the entity, such as maintained by McAfee, LLC. In addition, the system can determine whether a privacy reputation score is cached for the entity. If the system is caching the privacy reputation score, then the system can retrieve the score from the cache using, for example, read-only access. If the system is not caching the privacy reputation score or has not recently cached the privacy reputation score, the system can perform a real-time analysis of the privacy reputation score.

The system can begin the real-time analysis by accessing a web page of the entity, based on the received URL, domain, or package ID. In the case of a package ID, the URL of the entity can be stored locally or retrieved from an app store, based on the package ID. The system can execute a link identifier to identify various links from the home page of the entity. In particular, the link identifier can identify a link that directs to a privacy policy. For example, to comply with the General Data Protection Regulation (GDPR) of the European Union, many websites have links to a privacy notice or privacy policy. In many contexts, the phrases "privacy notice" and "privacy policy" are interchangeable. The link identifier can identify such links in different ways, such as a hypertext reference to a page at privacy_policy.html or privacy_notice.htm, anchor text stating "Privacy Policy" or "Privacy Notice," or following the link to a page entitled "Privacy Policy" or "Privacy Notice." Some implementations can scan text for those phrases after following the link.

If the link identifier identifies a link to a privacy policy, then the system can download the privacy policy by downloading the text, HTML page, or the like. (e.g., portable document format [PDF] and then performing optical character recognition). The system can then store the privacy policy in a memory. Accordingly, the system can provide the privacy policy for keyword extraction and/or risk exposure extraction of the entity.

In the keyword extraction, the system first processes the text of the privacy policy. For example, the system can remove whitespaces, such as tabs, line breaks, and page breaks from the privacy policy. In addition, the system can remove HTML tags, particularly when the system downloads the privacy policy in the form of a web page. Further, the system can convert accented characters and remove special characters to normalize linguistic processing. Additionally, select implementations of the system can remove stop words including, but not limited to, "the," "is," "at," "which," and "on."

Various implementations of the system perform additional processing in which the characters of the privacy policy are all made lowercase. To further normalize the linguistic processing, the system can expand contractions in the privacy policy and can convert numeric words to numbers.

Also, some implementations of the system can perform stemming and/or lemmatization. These related processes generally group together inflected forms of words, so that these forms can be identified by the words' lemma. In many implementations, the system can execute stemming faster than lemmatization, although lemmatization generally is more precise. Thus, the system can produce a normalized privacy policy.

The system then performs tokenization on the normalized privacy policy to convert the text of the policy into tokens. The tokenization prepares the text for further processing, notably during the process for risk exposure extraction.

Following the tokenization, the system can remove duplicate words before building a vocabulary of the text. Subsequently, the system can perform word embeddings to represent individual words as vectors in a vector space. Thus, the system can determine and store keywords included in the processed text.

In the risk exposure extraction, some implementations of the system receive the privacy policy and detect the language in which it is written.

In privacy policies, some authors erroneously emphasize negative statements by including double negatives. For example, an author might write, "we don't not collect your location" to mean that the entity emphatically does not collect a user's location. However, due to the double negative, it might wrongly be determined the entity does collect the location.

Accordingly, to avoid processing such double negative statements, select implementations of the system can ignore or delete negation in the text.

Then, the system can apply a part-of-speech filter to determine the part-of-speech for each of the words in the text. The part-of-speech filter can tag the words in the text with their part-of-speech.

The system can transmit the tagged words and the keywords to a keyword extractor. The keyword extractor processes the text to identify attributes and aspects, as described later. In some implementations, the keywords are manually curated and automatically generated from a small set of sample privacy policies that have been manually verified.

For example, the database can already contain some keywords, such as "user-biometric", "finance-card-payment", and "location".

Based on the identified attributes and aspects, the system can produce a privacy reputation score. For example, the system optionally can produce a reputation score for different risk contributors. The system subsequently can calculate the privacy reputation score based on these risk contributors.

The system then can transmit the privacy reputation score to a user. In addition, the system can store the privacy reputation score for read-only retrieval, as discussed previously.

Various implementations use privacy exposure attributes to compute quantitative risk scores. Privacy exposure attributes are basic data elements that together represent a user's privacy exposure from an online service. The privacy exposure attributes can be grouped into three types: entity attributes, source attributes, and data attributes.

The entity attributes capture information about the entity's data management, such as the regulatory compliance information of the entity and the legal jurisdiction of the entity. Other information captured about the entity's data management can include data security and data user control/deletion policies of the entity and guidance on how to implement the law of the jurisdiction.

The entity attributes often reflect an entity's implementation of rights granted to users in particular legal jurisdictions. One such right is the right to know about the personal information the entity collects and how the entity uses and shares the information. Some other such rights are the right of a user to delete personal information collected by the entity and the right of the user to opt-out of the entity's sale of their personal information. An additional such right is the right to non-discrimination by the entity for a user exercising their California Consumer Privacy Act (CCPA) rights.

The source attributes pertain to the resources from which the system extracted information regarding privacy. The system can track system attributes, because not all information is equally reliable. Then, this unequal reliability can create variation in the system's confidence. Because the attribute extraction engine merges information from multiple sources, the engine provides a confidence score for each attribute it extracts. In some implementations, the confidence score is a real number between zero and one, where zero indicates no confidence in the attribute being extracted, and one indicates full confidence.

The data attributes indicate specific types of data the user shares with the service. Some example data attributes are name, address, telephone number, social security number, health record, and credit card number. Many other data attributes exist, only some of which are disclosed in the present disclosure.

Subsequently, the system creates a common schema to identify and evaluate data attributes from all of the evidence sources. The data attributes are segregated into risk groups, as illustrated in FIG. 5.

Figure 5:
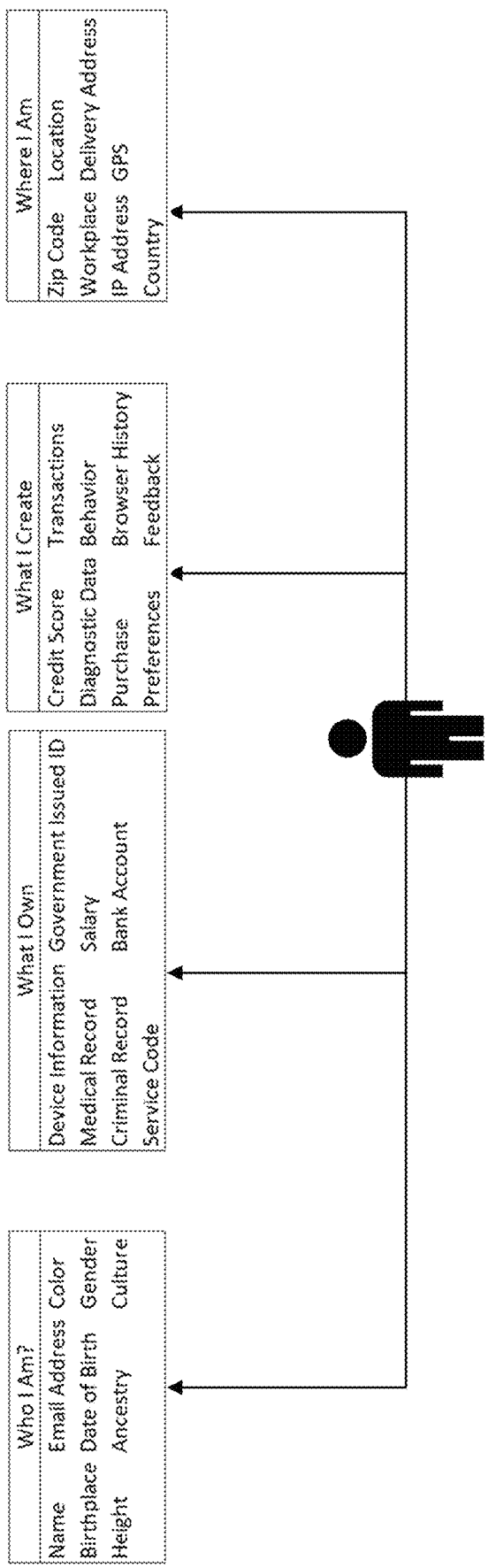
FIG. 5 depicts an exemplary data attribute segregation, according to various implementations of the present disclosure.

FIG. 5 depicts an exemplary data attribute segregation, according to various implementations of the present disclosure. The attribute risk group captures the type of the user's information in the data attribute. In various implementations, these risk groups are divided into personal information identifying the user, the user's digital assets, the user's activities, and the user's location.

Personal identifying information can answer the question, "Who I am." As illustrated in FIG. 5, some examples of personal identifying information include name, birthplace, height, email address, date of birth, color, gender, and culture.

Information about a user's digital assets can answer the question, "What I own." FIG. 5 shows some examples of digital asset information, such as device information, medical record, criminal record, service code, a government issued identification (ID), the user's salary, and the user's bank account.

Information about the user's activities can answer the question, "What I create." Examples of the activity information illustrated in FIG. 5 include a credit score, diagnostic data, a purchase, user preferences, transactions, behavior, browser history, and feedback left by (or for) the user.

The user's location information can answer the question, "Where I am." The examples of location information shown in FIG. 5 include zip code, workplace, IP address, country, location, delivery address, and global positioning system (GPS) location.

Select implementations of the common schema define, for a data attribute, aspects of granularity, risk implication, immutability, sensitivity, purpose, whether the attribute is mandatory, and whether the attribute is expected.

The granularity of the data attribute concerns how granular is the information the entity requests about the attribute. The common schema can define a different number of levels of granularity, depending on the attribute. For example, an entity can request a user's location with a low level of granularity, such as the state in which the user resides (e.g., for the purposes of establishing the applicability of particular laws or rights). Another entity can request a user's location with a middle level of granularity, such as the user's city or zip code (e.g., for the purposes of establishing nearby franchises). Still another entity can request the user's location at a high level of granularity, such as the user's address or GPS location. Of course, the location attribute can be defined with fewer (e.g., two) or more (e.g., four or more) levels of granularity.

The risk implication of a data attribute captures the nature and severity of the risks that can flow from exposure or misuse of the data attribute. In some implementations, the risk implication identifies a level of risk, such as on a scale from one to ten (or any other scale, such as one to 50) or a scale including low, medium, and high.

In various implementations, the risk implication additionally or alternatively identifies a type of risk. These risk types can include identity theft, financial risk, reputational risk, sensitivity information exposure, professional risk, credential compromise, and physical security. Additional or alternative risk types are within the scope of this disclosure.

The immutability of a data attribute indicates whether or not the data attribute can be changed following exposure to mitigate misuse. For example, passwords or a credit card number can be changed, but biometric data or date of birth cannot be changed.

Some implementations can qualify immutability to reflect difficulty in changing a data attribute. For example, some implementations of the system can consider a mailing address to not be immutable, because a user can register a post office box. However, the system can consider a residence address to be somewhat immutable, because changing the data attribute is a substantial task.

The sensitivity of a data attribute can be quantified by the system on two scales: objective and subjective. The objective sensitivity relates to data attributes on which views mostly are clear. For example, the system can consider a birthdate to be of medium sensitivity, as considered private information that nonetheless is frequently shared. Further, the system likewise can consider a fingerprint to be of medium sensitivity, as considered private information that is placed on surfaces throughout a user's life. Select implementations of the system can consider a location to be highly sensitive as a user has limited ability to avoid particular locations, such as their home or their work address.

The subjective sensitivity relates to data attributes on which the sensitivity varies by user. For example, a particular user might not mind revealing a travel plan, but another user might. Most implementations of the system grant a higher preference to the subjective value.

The sensitivity quantification can be performed on a qualitative scale (e.g., low, medium, or high) or on a quantitative scale (e.g., zero to one, one to ten).

The purpose aspect of a data attribute reflects the purpose for which the entity collects the data attribute. The system can extract the purpose from the evidence resources when available. A privacy policy is an example of such an evidentiary source.

Examples of purposes can include targeted ads, age verification, and authentication.

As discussed previously, another aspect of the attribute is whether the attribute is mandatory for the entity's service or not (e.g., is optional). The determination as to whether the attribute is mandatory can be based on the nature of business of the entity, discussed in more detail later.

Some implementations of the common schema can define more than two levels indicating whether the attribute is mandatory. For example, one implementation can determine whether the attribute is mandatory, unverified, or optional. Additional or alternative levels are within the scope of the present disclosure.

A mandatory attribute is a data attribute required by the entity and that must be correct. For example, for an entity providing a delivery service, a delivery address is considered mandatory.

An unverified attribute is a data attribute required by the entity, but for which the entity does not verify correctness. For example, a service for playing video games might request a date of birth of a user for purposes of serving appropriate advertisements. However, the service might have no way to verify the user was actually born on the particular date. Thus, the service might accept a fake date of birth from a user.

An optional attribute is a data attribute not required by the service. For example, an application for a dating service does not require a user's phone number for functionality but can request it.

Another aspect of an attribute is whether the attribute is expected of the entity's nature of business. To determine whether the attribute is expected, the system first determines a service category of the entity. Example service categories include online shopping, banking, and sports news.

Then, attributes requested by entities within the service category are analyzed to determine whether those attributes are commonly requested. In some implementations, this analysis can be performed by a human and entered into the system. In other implementations, the system itself can perform a statistical analysis for each requested attribute to determine how commonly it is requested by entities within the service category. This statistical analysis can be aided by machine learning in select implementations.

As an example, online shopping entities commonly request the names and addresses of users, as a name and address are typically used to ship a purchased product to the user. In this case, the system would determine the name and address attributes requested by such an entity are expected of the entity's nature of business. In contrast, an online shopping entity typically would not request the criminal record of a user. Thus, if an entity in the service category of online shopping requests a user's criminal record, then the system determines the criminal record requested by this entity is not commonly requested.

Based on the privacy exposure attributes, various implementations according to the present disclosure score an entity's privacy exposure for a user. Specifically, the system calculates an exposure index that represents a quantitative measure of the privacy exposure and risk incurred by the user in using an online service of the entity. In some implementations, the index ranges from zero to ten, where a higher value is worse (indicating greater risk), and a lower score is better.

The system can calculate the index, based on some or all of the privacy attributes extracted from the various evidence sources as described above.

In select implementations, the system can individually weight each attribute, its various aspects, and a confidence score for their risk measure. Then, the system can sum up the cumulative risk of all of the attributes. In some implementations, the system additionally can consider the increased risk posed by combinations of attributes. For example, third party entities might commonly use a combination of information for password reset and/or security questions. One such combination of information is a user's date of birth and the birth name of a user's legal guardian (e.g., mother).

Subsequently, the system can weight the total risk from all attributes by service level factors of the entity. Examples of these service level factors include the regulatory compliance standard of the entity and a legal jurisdiction in which the entity is headquartered or otherwise conducts business.

Figure 6:
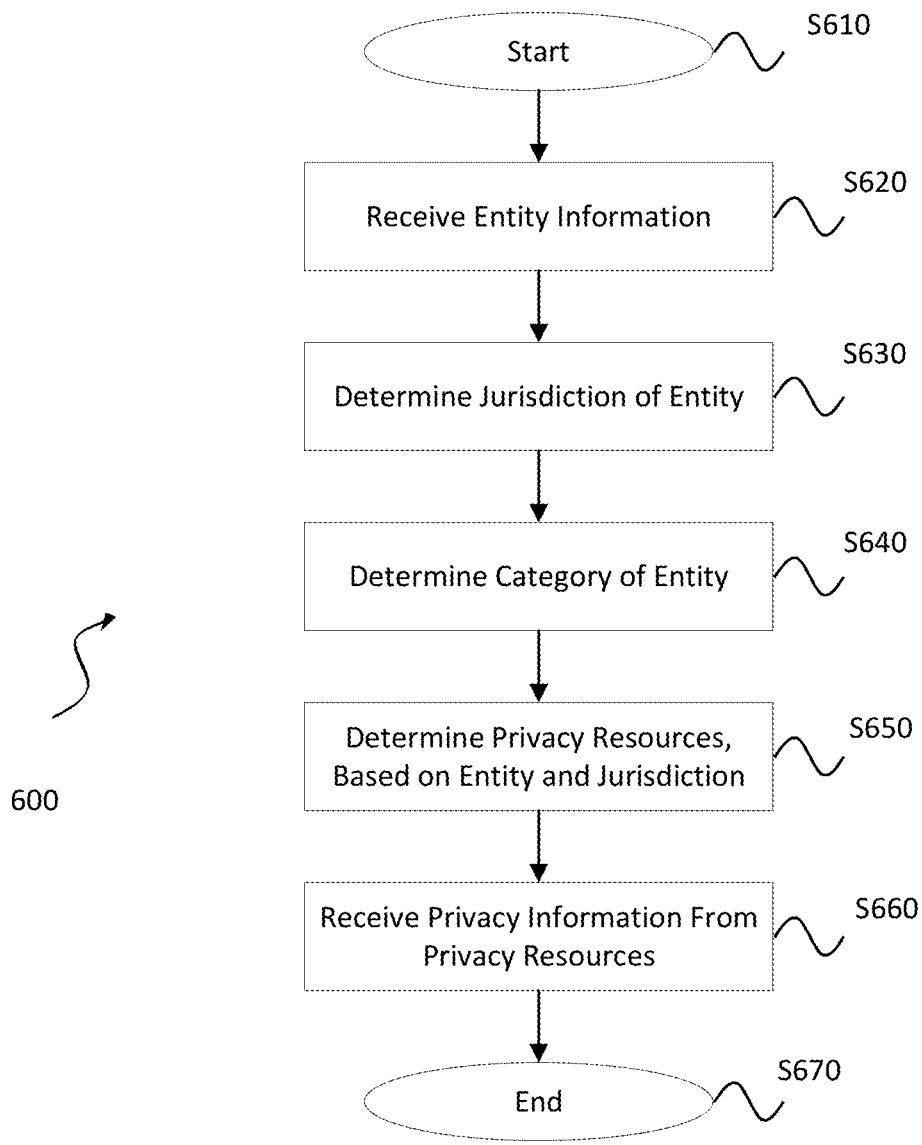
FIG. 6 depicts an algorithm for identifying available resources, according to various implementations of the present disclosure.

FIG. 6 depicts an algorithm 600 for identifying available resources, according to various implementations of the present disclosure. The algorithm 600 begins at S610 and advances to S620.

In S620, the system receives entity information. In many implementations, a network interface of the system receives, from a client (e.g., a user's device), a request identifying the entity information. In some implementations, the system receives the entity information from a request internal to the system. The entity information can be or include a domain, a URL, an IP address, a package ID, or a name of the entity.

Often, entities have multiple domains, URLs, IP addresses, and package IDs to represent different products, services, and/or brands. Nevertheless, an individual domain, URL, IP address or package ID typically shares some connection with the entity. Thus, in many implementations, the system can reference the domain, URL, IP address, or package ID against a list of entities to identify the entity. The system can initially generate this list of entities by retrieving a list of the 1000 most popular websites or apps, for example. The system can periodically update the system, of course.

The algorithm 600 then advances to S630.

In S630, a processor of the system determines a jurisdiction of the entity, at least in part based on the entity information. For example, the processor can perform a whois lookup of the domain, URL, or IP address via the network interface to determine a jurisdiction (e.g., postal address, country, state) of the entity.

In the case of a package ID, the processor can retrieve a URL associated with the package from an app store. The processor also can retrieve a registration of a publisher of the application from the app store. In some implementations, the processor can retrieve from the app store a legal system designated by the entity or publisher. The system can perform the above-described natural language processing to recognize the legal system in select implementations.

Further, in various implementations, the entity information can include the jurisdiction based on a country code top-level domain. In addition, a user can specify the jurisdiction in which they live, for example.

The algorithm 600 then advances to S640.

In S640, the processor of the system determines a category of the entity. A category can be defined at different levels of granularity. For example, one category can be "ecommerce," and a more specific category can be "online toy store." Some implementations determine multiple categories for the entity. The categories can be defined based on the list of popular websites or apps, for example. The algorithm 600 then advances to S650.

In S650, the processor of the system determines available privacy resources, based on the entity and/or the jurisdiction. For example, different entities offer different levels of transparency as a customer service. In some situations, the system simply can accumulate more information about one entity than another, for example, in the case that an entity has more than one domain.

In addition, different jurisdictions require different levels of transparency for different types of entities. For example, in the United States, publicly-traded companies have higher disclosure requirements than privately-held companies. Further, some jurisdictions regulate that different categories of entities provide different privacy resources.

Privacy resources determined by the system can be or include, for example, privacy policies on web pages, entries for packages in app stores, federal regulatory agencies (e.g., US Securities and Exchange Commission (SEC) or Federal Trade Commission (FTC)), governmental (e.g., state) business registrations, consumer protection agencies (e.g., Better Business Bureau, Consumer Reports), a user's profile for the entity (e.g., registration to order a product), and crowd-sourced sites (e.g., Yelp, Gatello).

The algorithm 600 then advances to S660.

In S660, the processor receives privacy information from the privacy resources in S650. In many implementations, the processor first contacts these privacy resources via the network interface. For example, the network interface can contact the domain or URL included in the entity information. The network interface can contact different app stores based on the package ID. The network interface can contact governmental entities in the jurisdiction determined in S630. For example, the network interface can contact state corporation commissions, or federal regulatory agencies. In some situations, the processor can request the network interface contact centralized resources, such as consumer protection agencies and crowdsourced sites.

In select implementations, the privacy resources can be retrieved via a webpage, such as by the hypertext transfer protocol. In various implementations, the system can retrieve the resources via file transfer protocol, BitTorrent, or some other protocol.

The algorithm then advances to S670 and concludes.

Figure 7:
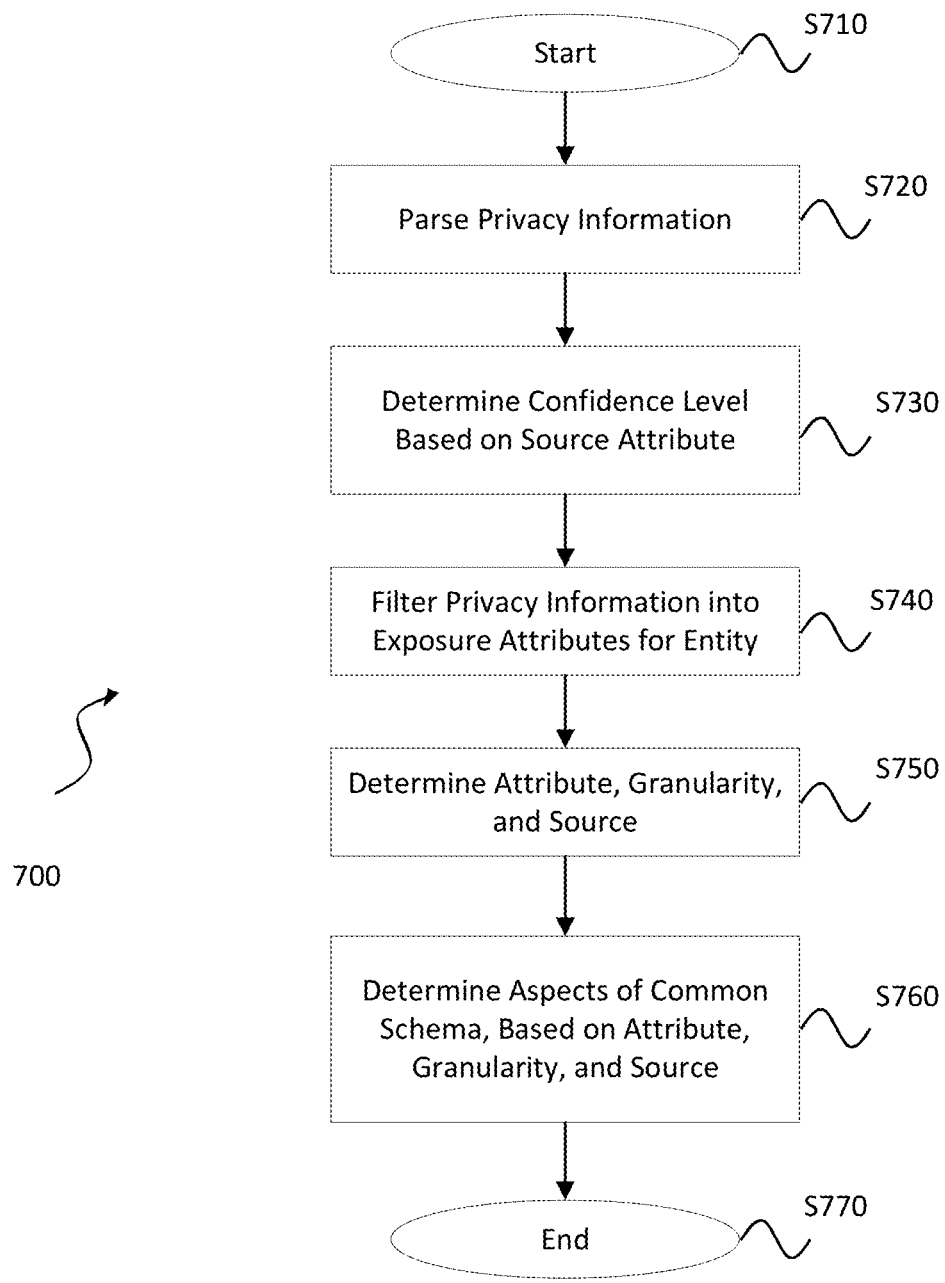
FIG. 7 depicts an algorithm for extracting and classifying data, according to various implementations of the present disclosure.

FIG. 7 depicts an algorithm 700 for extracting and classifying data, according to various implementations of the present disclosure. Many implementations construct a common schema while performing the algorithm of FIG. 7.

Table 1 illustrates an example of a common schema having six entries for an entity named ABC Entity.

TABLE 1

| Entity/Business | Attribute | Source | Risk Group | Purpose |
|---|---|---|---|---|
| ABC Entity | Date of Birth | Privacy Policy | Personal Information | Targeted Ads |
| ABC Entity | Date of Birth | Form Fill | Personal Information | Age Verification |
| ABC Entity | Date of Birth | Browser Database | Personal Information | Age Verification |
| ABC Entity | Fingerprint | App Manifest | Personal Information | Authentication |
| ABC Entity | Location | Privacy Policy | Location | Targeted Ads |
| ABC Entity | Location | App Manifest | Location | Targeted Ads |

| Entity/Business | Attribute | Granularity | Trackover |
|---|---|---|---|
| ABC Entity | Date of Birth | N/A | N/A |
| ABC Entity | Date of Birth | High (Full DOB Format) | N/A |
| ABC Entity | Date of Birth | High (Full DOB Format) | N/A |
| ABC Entity | Fingerprint | High | N/A |
| ABC Entity | Location | N/A | N/A |
| ABC Entity | Location | High (GPS) | Yes |

| Entity/Business | Attribute | Risk Implication | Immutability |
|---|---|---|---|
| ABC Entity | Date of Birth | Credential Compromise (Password Reset) | Immutable |
| ABC Entity | Date of Birth | Credential Compromise (Password Reset) | Immutable |
| ABC Entity | Date of Birth | Credential Compromise (Password Reset) | Immutable |
| ABC Entity | Fingerprint | Credential Compromise (Password Reset) | Immutable |
| ABC Entity | Location | Physical Security | Not Immutable |
| ABC Entity | Location | Physical Security | Not Immutable |

| Entity/Business | Attribute | Sensitivity | Mandatory | Confidence |
|---|---|---|---|---|
| ABC Entity | Date of Birth | Objective: Medium, Subjective: High | No | 0.5 |
| ABC Entity | Date of Birth | Objective: Medium, Subjective: High | Yes | 0.2 |
| ABC Entity | Date of Birth | Objective: Medium, Subjective: High | Yes | 0.2 |
| ABC Entity | Fingerprint | Objective: Medium, Subjective: High | Yes | 0.2 |
| ABC Entity | Location | Objective: High, Subjective: High | No | 0.5 |
| ABC Entity | Location | Objective: High, Subjective: High | Yes | 0.5 |

Returning to FIG. 7, the algorithm 700 begins at S710 and advances to S720.

In S720, the processor of the system parses the privacy information received, e.g., in S660. This parsing can be performed using natural language processing techniques, such as those discussed above with regard to FIG. 4. The algorithm 700 then advances to S730.

In S730, the processor determines a confidence, based on the source attribute of a source. The processor can determine the confidence, based on the authenticity of the source and the probability of accurately understanding the source in the natural language processing.

The processor can determine the authenticity, based on a perceived trustworthiness of the source. For example, the processor can assign a very high authenticity to data actually collected by the entity from a user's profile (e.g., data provided by the user to the entity), such as via a web form. In addition, the processor can assign a high authenticity to privacy information collected from permissions indicated for an app in an app store or an app manifest. The processor can assign a moderate authenticity to privacy information collected from a privacy page. Further, the processor can assign a low authenticity to privacy information collected from a crowdsourced site or information assumed to be collected based on the category of the entity.

In many implementations, the system can express these authenticities in numeric form. For example, the processor can assign a value of 1.0 to a very high authenticity, a value of 0.9 to a high authenticity, a value of 0.5 to a moderate authenticity, and a value of 0.2 to a low authenticity. Implementations of the system can assign different numeric values to the authenticity levels, and the system is not limited to these four authenticity values.

Further, the processor can determine the probability of understanding the source, based on the confidence of the natural language processing performed on the source. For example, information requested by a registration form generally is specific and standardized and, therefore, is more likely to be understood by the system. Accordingly, the system can assign the registration form a high probability of understanding. On the other hand, a complicated document, such as an SEC filing, is less likely to be understood by the system. Therefore, the system can assign the SEC filing a low probability of understanding.

The algorithm 700 then advances to S740.

In S740, the processor of the system can filter the privacy information into exposure attributes for the entity. For example, the system can define exposure attributes such as those illustrated in FIG. 5. Of course, other exposure attributes are possible, such as bank name, debit card number, and card CVV.

For the system to maintain a comprehensive list of attributes, the system can identify attributes as they are requested by entities. For example, the system can identify when web forms request an attribute not previously identified (e.g., by having a field identified by an unrecognized label). The system can recognize new information in a web database and when app permissions request a new attribute. This identification can be performed, for example, in a manner similar to that of the natural language processing described above. In select implementations, the attributes can be updated by a system administrator.

The algorithm 700 then advances to S750.

In S750, the processor determines, for each attribute, a granularity of the attribute requested by the entity and the source that indicated the granularity of the requested attribute. For example, as shown in Table 1, the privacy policy (e.g., source) of ABC entity describes the user verifying being over a particular age, for example, for the purpose of targeted advertisements. For example, the user might click a button indicating they are over 21 years old (e.g., no granularity). Further, ABC Entity also requested the user enter their exact date of birth (e.g., high granularity) when filling out a form.

In this case, the processor created a common schema having plural entries for the date-of-birth attribute of ABC Entity, as shown in Table 1. The first row includes an entry for the date-of-birth attribute indicated by the privacy policy. In the first row, the processor can determine there is no sense of granularity, as the actual birthday of the user is not implicated by clicking the button.

The second row of the common schema includes an entry for the date-of-birth attribute indicated by the form fill. In the second row, the granularity is high, because the form requested the full date-of-of-birth of the user.

In some implementations, the system can determine a highest granularity for the attribute. By the system providing an identification of the highest granularity of the attribute to the user, the user can better understand their exposure to the entity. For example, the user might initially share that they are over 18 years old (e.g., no granularity) but might be asked later for their exact birthdate (i.e., high granularity). The user can make an informed decision to not begin sharing their information with the entity, because the user is unwilling to provide the most granular information requested by the entity.

The algorithm 700 then advances to S760.

In S760, the processor completes other entries in the common schema, at least in part based on the attribute, granularity, and source determined in S760. For example, the processor can determine, for each attribute, the attribute risk group, the purpose, the trackover, the risk implication, the immutability, the sensitivity, and whether the attribute is mandatory.

For example, the processor can determine the attribute risk group(s) to which the attribute belongs. In some implementations, the attribute risk group can be personal and attitudinal. The attribute risk group can pertain to who the user is, their life stage, their past incidents, their net worth, and so on. Table 2 illustrates an example of attribute risk groups to which the processor determines sample attributes belong.

TABLE 2

| Segregation | Attribute Risk Group | Sample Attributes |
|---|---|---|
| Who I Am | Public Identity Information | First Name, Legal Name, Email Address |
| | Personally Identifiable Information | Telephone Number |
| | Personal Information (Detailed) | Age, Gender, Orientation, Biometrics |
| What I Own | Digital Devices | Laptops, Mobile Phones, IoT Devices |
| | Digital Service Assets | Email Accounts, Social Media Accounts, Online Shopping Accounts, Digital ID Provider Accounts |
| | Financial Assets | Bank Accounts, Stock Trading Accounts |
| | Physical Assets | Cars, Real Estate, Property |
| What I Create | Digital Content | Photos, Videos, Blogs, Comments, Emails, Short Message Service (SMS) Messages |
| Where I Am | Location (Home) | Zip Code, Country, Delivery Address |
| | Location (Workplace) | IP Address, Office Address |

Although the attribute risk groups in Table 2 are segregated consistently with FIG. 5, such segregation is optional in many implementations of the present specification.

As discussed previously, the purpose denotes the purpose for which the attribute is being collected. Table 1 includes exemplary purposes of target advertisements, age verification, and authentication. Other purposes include, for example, product delivery.

The trackover entry concerns whether the entity tracks the attribute over time (e.g., generates a history for the attribute). In many implementations according to this disclosure, the common schema includes the trackover.

The risk implication captures the nature and severity of the risks that can flow from exposure or misuse of the attributes, as discussed above. Accordingly, assorted implementations include in the common schema all implications for each attribute. Table 3 illustrates an example of risk implications to which the processor determines some sample risk groups belong.

TABLE 3

| Risk Implication | Risk Group |
|---|---|
| Financial Fraud | Financial Data |
| Reputation Damage | Personal Identifiable, Health Data, Content Data, Special Personal Data |
| Credential Compromise | Personal Identifiable, Special Personal Data |

The immutability of an attribute indicates whether the attribute can be changed. In the example of Table 1, the processor determines the attributes of date of birth and fingerprint are immutable, because they cannot be changed. The processor determines the attribute of location is not immutable, because it can be changed.

The sensitivity of an attribute is a quantification of how sensitive is an attribute from both subjective and objective perspectives. Some implementations of the system consider sensitivity from a single value (e.g., only subjective, only objective, or a combination of subjective and objective).

The processor determines an objective sensitivity for each attribute in the schema. In the example of Table 1, the processor determines the objective sensitivity of the date-of-birth and fingerprint is medium, as discussed above. Further, the processor determines the objective sensitivity of the location is high, also as discussed above.

The processor can determine the subjective sensitivity, based on a user's feedback. For example, in an implementation of the present disclosure, the user indicates their subjective sensitivities of particular attributes, when registering to use the privacy exposure assessment system. The user also can indicate their subjective sensitivities when submitting a domain, URL, or package ID for assessment.

Some implementations of the system request the user's feedback, based on the attributes requested by a particular entity. For example, a user might view the sensitivity of their travel plans to be high for one entity (e.g., an online calendar), because doing so would disclose their location at a particular time. On the other hand, the same user might view the sensitivity of their travel plans as low for another entity, because that entity obfuscates the user's location (e.g., relates to a museum in an area, where the museum provides an alternative location for the user at an unspecified time).

In the example of Table 1, the user has indicated their subjective view of the sensitivity of their date of birth, fingerprint, and location all being high.

The processor can determine whether the data attribute is mandatory, based on the category of the entity and the purpose, for example. As one example, the processor can determine that a criminal record attribute is not necessary for online shopping entities. On the other hand, a further category of online shopping entities might require a criminal record, such as entities that sell locksmith supplies.

In the example of Table 1, the processor determines the date of birth attribute is not mandatory for the purpose of targeted advertisements. Further, in the example of Table 1, the processor determines the date of birth attribute is mandatory for the purpose of age verification.

The algorithm 700 then advances to S770 and concludes.

Figure 8:
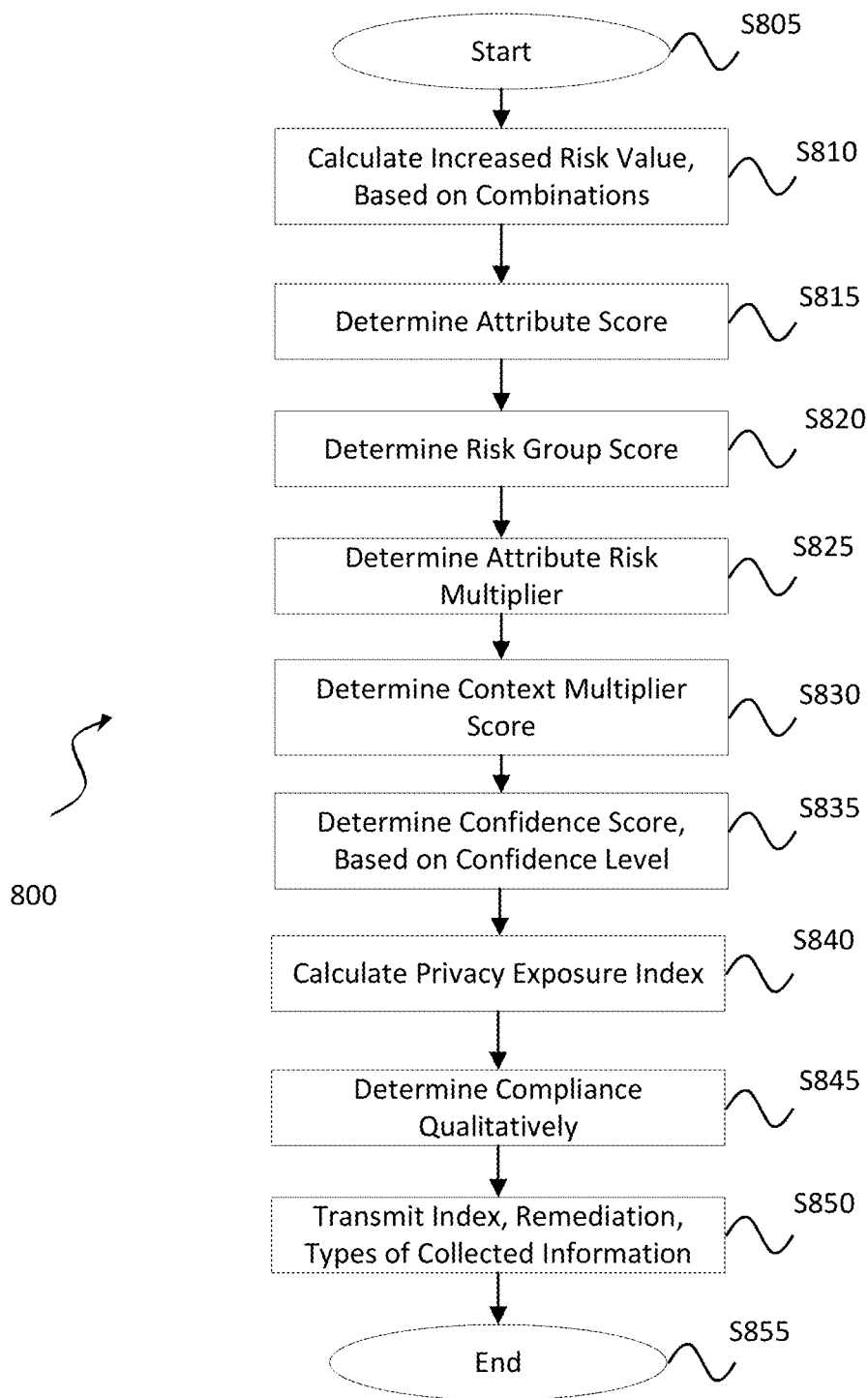
FIG. 8 depicts an algorithm for quantifying privacy exposure risks, according to various implementations of the present disclosure.

FIG. 8 depicts an algorithm 800 for quantifying privacy exposure risks, according to various implementations of the present disclosure. The algorithm 800 begins at S805 and advances to S810.

In S810, the processor computes an increased risk value, based on combinations of attributes. For example, if the common schema indicates the entity requests both the attributes of a user's date of birth and the birth name of the user's mother, then there is an increased risk value, as discussed above. Similarly, the processor can consider the disclosure of both a bank name and an account number at that bank to have an increased risk value, relative to the disclosure of a bank name and an account number separately.

The algorithm 800 then advances to S815.

In S815, the processor determines an attribute score for each data attribute. For example, the processor assigns score values to each data attribute based on the nature/type of the attribute and attribute value. For example, the processor can assign a data attribute of a medical record a higher exposure index, because the entity requests diagnosis details.

As another example, the processor can assign a data attribute of a debit card number a higher exposure index, because the entity requests more fine-grain values rather than coarse-grain values. In such an example, the processor can assign a higher value to an attribute in which the entity requests the full debit card details rather than merely the last four digits of the debit card number.

Table 4 illustrates an example of attribute scores assigned to different attributes in the financial data attribute risk group. The risk level is a qualitative approximation of the attribute score.

TABLE 4

| Attribute | Risk Level | Attribute Score |
|---|---|---|
| Bank Name | Low | 1 |
| Bank Account Number | Medium | 1.1 |
| Credit Card Number | Medium | 1.2 |
| CVV | High | 1.3 |
| High-Security Password | Very High | 1.4 |
| Telephone PIN | Very High | 1.5 |

The algorithm then advances to S820.

In S820, the processor determines the risk group score for the risk group determined for the attribute in S760. Table 5 illustrates an example of risk group scores assigned to different risk groups.

TABLE 5

| Risk Group | Score |
|---|---|
| Browsing History | 1 |
| Children Data | 8 |
| Content Data | 3 |
| Diagnostic Data | 2 |
| Financial Data | 8 |
| Health Data | 7 |
| Personal Identification | 4 |
| Social | 5 |
| Special Personal Data | 6 |
| Student Data | 6 |

In many implementations, the processor determines the attribute risk group score by combining similar data attributes (e.g., debit card and credit card) and picking the higher attribute value.

Thus, the attribute risk group scores determined in S820 capture the exposure risk at a coarse level. Further, within the group, different attributes can have a higher or lower risk as determined at a fine level in S815. For example, data attributes from the financial asset risk group can include a bank name, an account number, a debit card number, and a card CVV. These attributes pose a relatively high risk, as they constitute financial information. Further, exposure of some of these attributes is much riskier than others. For example, exposure of the debit card number and the card CVV poses more risk than just the bank name.

The algorithm 800 then advances to S825.

In S825, the processor determines the attribute risk multiplier. The attribute risk multiplier considers the potential of risk or sensitivity of having the attribute associated with the specific entity. That is, the attribute risk multiplier can modulate the risk of disclosing the private information of the attribute, based on the association of the private information with the entity.

For example, many implementations of the system determine that associating personal information, like an email address, with an entity, like an ecommerce service, is less sensitive. On the other hand, associating an email address with an entity like a political organization, a social group, a health service, or a dating service can be more sensitive. Thus, the attribute risk multiplier can reflect potential societal views of the association.

The attribute risk multiplier also can reflect the number or detail of additional attributes requested by the entity. For example, if the entity requests multiple data attributes, each additional item of information makes the user at least marginally more identifiable.

In many implementations, the attribute risk multiplier is a product of the granularity, the risk implication, the immutability, and the sensitivity of the attribute.

The algorithm 800 then advances to S830.

In S830, the processor determines the context multiplier score for the attribute. For example, the processor first can score the purpose of the entity in requesting the attribute, whether providing the attribute by the user is mandatory, and whether requesting the attribute is expected for the nature (e.g., category) of the business. These aspects of the attribute overlap to some extent, because many entities have a policy to request private information only relating to those attributes that are mandatory. Because some entities do not follow such a policy, many implementations of the system consider these aspects separately.

The processor can determine a purpose score, based on the extent to which the purpose of the entity in requesting the attribute is consistent with the category of the entity. For example, the processor can assign a low purpose score (e.g., less risky) to an entity that requests a user's age attribute for targeted advertisements, if the entity is a social media entity. The reason is that entities in the social media category often generate revenue by selling user demographics for targeted advertising. On the other hand, the processor can assign a high purpose score (e.g., more risky) to an entity that requests a user's age attribute for targeted advertisements, if the entity is an ecommerce site. The reason is that entities in the ecommerce category typically generate revenue in other manners.

The processor can produce a requisiteness score, based on whether the attribute is mandatory for the category of the entity. For example, the processor can assign a high requisiteness score (e.g., more risky), if the attribute is optional. As discussed above, a user's age generally is an optional attribute for a general ecommerce site. The processor can assign a moderate requisiteness score, if the attribute is unverified. A user's age might be unverified for an ecommerce site specifically selling video games, movies, or music that might have suggested, but not required, age restrictions. Further, the processor can assign a low requisiteness score (e.g., less risky), if the attribute is mandatory. Some implementations of the system consider a user's age to be mandatory for an ecommerce site selling alcohol or tobacco in a particular jurisdiction.

In an example differentiating the purpose score from the requisiteness score, an ecommerce site might request an attribute of a work address of a user. In some implementations, the processor scores the purpose score low (e.g., low risk), because a shipping address is consistent with the business purpose of an ecommerce site. Additionally, the processor scores the requisiteness score high, because the attribute of a work address specifically (as opposed to an address generally) is optional.

Further, the processor can produce an expectedness score. In many implementations, the processor can score the expectedness score low (e.g., low risk), if the attribute requested by the entity is commonly requested by other entities in the same category. Further, the processor can score the expectedness score high (e.g., high risk), if the attribute requested by the entity is not commonly requested by other entities in the same category.

In the above example of an ecommerce site requesting a work address, the processor can score the expectedness score high. The reason is that ecommerce sites generally do not request a work address.

As a further example, a social media site can request the attribute of a user's telephone number. Many social media sites request a user's telephone number as a mechanism for authenticating the user. Still, the user can be authenticated in other ways. Thus, in this further example, the processor can score the requisiteness score high and the expectedness score low.

The processor can then combine one or more of the purpose score, the requisiteness score, and the expectedness score to determine the context multiplier. For example, the processor can multiply the purpose score, the requisiteness score, and the expectedness score to produce the context multiplier.

The algorithm 800 then advances to S835.

In S835, the processor determines a confidence score, based on the confidence level, for example, as determined in S730. If the confidence determined in S730 is high, then the processor determines the confidence score in S835 is high. The reason is that this attribute should contribute significantly to the privacy exposure index. On the other hand, if the processor determines in S730 that the confidence is low, then the processor determines the confidence score in S835 for this attribute is low. The reason is that this attribute should not contribute significantly to the privacy exposure index.

The algorithm 800 then advances to S840.

In S840, the processor determines the privacy exposure index for all attributes requested by the entity. In particular, the system can collect privacy attributes and their assigned scores from all evidence resources to calculate the privacy exposure index. Specifically, the privacy exposure index can be calculated as $$\sum_{Data\ Attributes} \text{risk group} \times \text{attribute} \times \text{attribute risk multiplier} \times \text{context multiplier} \times \text{confidence},$$

where for each attribute, the risk group is the risk group for the attribute determined in S820; the attribute score is the score of the attribute determined in S815; the attribute risk multiplier is the score determined in S825; the context multiplier is determined in S830; and the confidence is the confidence score determined in S835.

The algorithm 800 then advances to S845.

In S845, the processor determines the compliance of the entity qualitatively.

Laws increasingly recognize user's rights regarding their private information. For example, some governments grant users the right to know about the personal information an entity collects and how the entity uses and shares that information. Another recognized right is the right to delete personal information collected from the user. Further, some rights granted include the right of users to opt-out of the sale of their personal information and the right to non-discrimination for exercising their rights (e.g., under the CCPA).

Compliance with these laws by entities gives consumers more control over personal information that the entities collect about them. Compliance is a responsibility and process that allows the entities to meet rules and regulations regarding the storage and management of sensitive data that passes through every day.

Thus, in some implementations, a processor of the system can determine the level of compliance based on several considerations. These considerations include regulatory compliance, data handling practices, security practices, and the legal jurisdictions of the entity and the user. Further, in addition to legal compliance, the processor can determine the compliance of the entity, at least in part based on the entity's accountability to third parties, such as the Better Business Bureau and Consumer Reports.

In many implementations of the present disclosure, the compliance score is binary (e.g., zero or one, true or false).

The algorithm 800 then advances to S850.

In S850, the processor instructs the network interface to transmit the index, remediation, types of information (e.g., attributes), and the level of compliance to a device of the user.

The algorithm 800 then advances to S855 and concludes.

Figure 9:
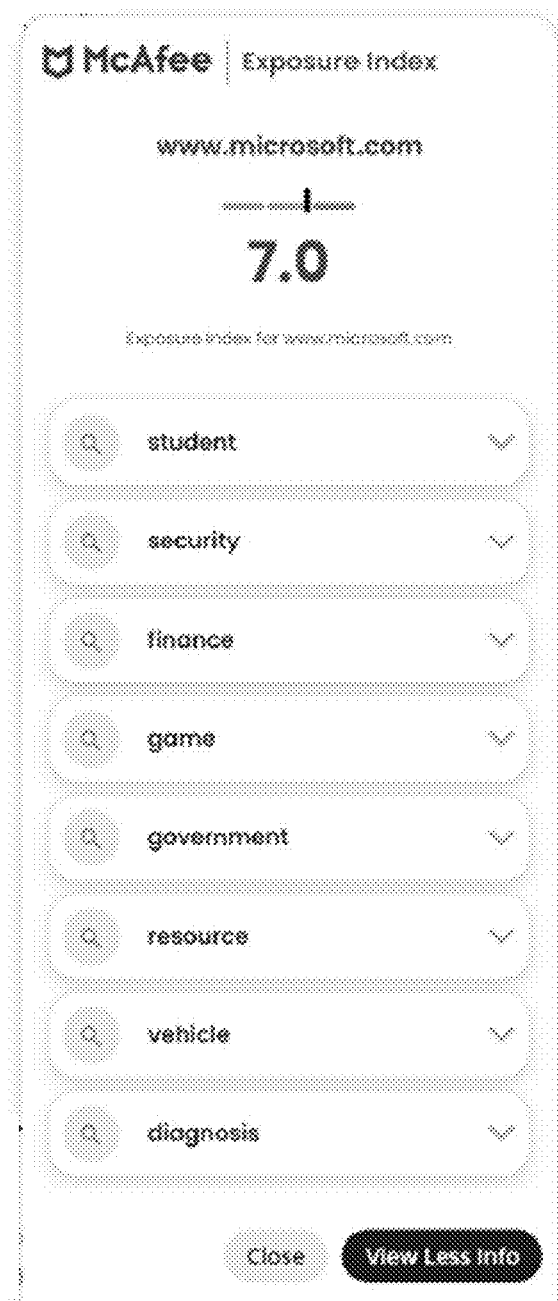
FIG. 9 depicts a sample application snapshot, according to various implementations of the present disclosure.

FIG. 9 depicts a sample application snapshot, according to various implementations of the present disclosure. As shown in FIG. 9, the snapshot indicates a domain of www.microsoft.com. The snapshot illustrates an exposure index of 7.0. The snapshot also indicates the type of information requested by the site, such as whether the user is a student. The user can expand these types of information to learn more about the specific attributes requested. For example, the student information can include a school in which the user is enrolled and the user's student status (e.g., fulltime, part-time, undergraduate, graduate).

Figure 10:
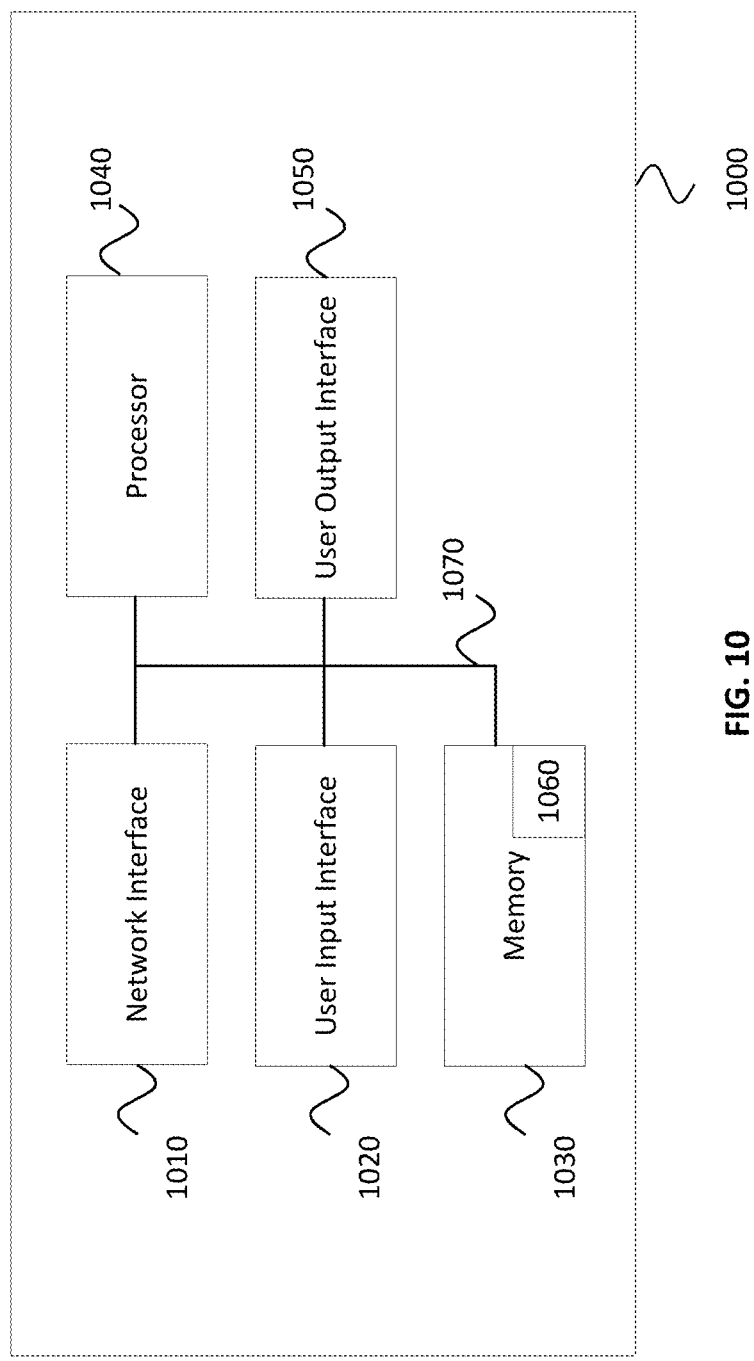
FIG. 10 depicts a system, according to various implementations of the present disclosure.

FIG. 10 illustrates a computing device 1000, according to an implementation of the present disclosure.

Although illustrated within a single housing, the computing device 1000 can be distributed across plural housings or sub-systems that cooperate in executing program instructions. In some implementations, the computing device 1000 can include one or more blade server devices, standalone server devices, personal computers (including laptop computers and tablet computers), routers, hubs, switches, bridges, firewall devices, intrusion detection devices, mainframe computers, network-attached storage devices, video game systems, smartphones and other mobile telephones, and other computing devices. The computing device 1000 can execute the Windows® operating system (OS), Linux OS, or Android OS in many implementations. The hardware of the computing device 1000 can be configured according to a Symmetric Multi-Processing (SMP) architecture or a Non-Uniform Memory Access (NUMA) architecture.

The computing device woo can include a network interface 1010 that provides one or more communication connections and/or one or more devices that allow for communication between the computing device 1000 and other computing systems (not shown) over a communication network or collection of networks (not shown) or the air. The network interface can communicate using near-field communications (NFC), Wi-Fi™, Bluetooth, Ethernet, cellular (e.g., 4G, 5G), facsimile, or any other wired or wireless interface. The network interface 1010 is an example of a communication means.

The computing device woo can also include a user input interface 1020 that receives inputs from a human. The user input interface 1020 can be or include a mouse, a touchpad, a keyboard, a touchscreen, a trackball, a camera, a microphone, a joystick, a game controller, a scanner, a drawing tablet, or any other input device.

The computing device 1000 can include a memory 1030, also termed a "storage." The memory 1030 can include or be one or more computer-readable storage media readable by a processor 1040 and that store software. The memory 1030 can be implemented as one storage device and can also be implemented across multiple co-located or distributed storage devices or sub-systems. The memory 1030 can include additional elements, such as a memory controller, that communicate with the processor 1040. The memory 1030 can also include storage devices and/or sub-systems on which data and/or instructions are stored. The computing device 1000 can access one or more storage resources to access information (e.g., a program) to carry out any of the processes indicated in this disclosure and, in particular, FIGS. 2-4 and 6-8.

The memory 1030 can be or include a read-only memory (ROM), a programmable ROM (PROM), an erasable PROM (EPROM), an electrically erasable PROM (EEPROM), a random-access memory (RAM), a dynamic RAM (DRAM), a static RAM (SRAM), a hard drive, a cache memory, a flash memory, a removable disk, or a tape reel. The memory 1030 can be or include resistive RAM (RRAM) or a magneto-resistive RAM (MRAM). Other implementations are possible. The memory 1030 is an example of a storing means.

A privacy exposure assessment program 1060 stored in memory 1030 can include routines for at least partially performing at least one of the processes illustrated in FIGS. 2-4 and 6-8 and can be implemented in program instructions. Further, the software, when executed by the computing device 1000 in general or the processor 1040 specifically, can direct, among other functions, the computing device woo or the processor 1040 to perform the privacy exposure assessment methodology as described herein.

The computing device 1000 can include a processor 1040 (e.g., a processing unit). The processor 1040 can perform the operations of privacy exposure assessment. The processor 1040 can be or include one or more hardware processors and/or other circuitry that retrieve and execute software from the memory 1030. The processor 1040 can be implemented within one processing device, chip, or package and can also be distributed across multiple processing devices, chips, packages, or sub-systems that cooperate in executing program instructions. The processor 140 is an example of a processing means. In some implementations, the processor 1040 is or includes a Graphics Processing Unit (GPU).

The processor 1040 can have any register size, such as a 32-bit register or a 64-bit register, among others. The processor 1040 can include multiple cores. Implementations of the processor 1040 are not limited to any particular number of threads. The processor 1040 can be fabricated by any process technology, such as 14 nm process technology.

The computing device 1000 can also include a user output interface 1050 that outputs information to a human user. The user output interface 1050 can be or include a display (e.g., a screen), a touchscreen, speakers, a printer, or a haptic feedback unit. In many implementations, the user output interface 1050 can be combined with the user input interface 1020 to include, for example, a touchscreen, a headset including headphones and a microphone, or a video camera preview/review screen.

The computing device 1000 also includes a bus 1070. The components of computing device 1000 can communicate with each other via the bus 1070.

In implementations including multiple computing devices, a server of the system or, in a serverless implementation, a peer can use one or more communications networks that facilitate communication among the computing devices. For example, the one or more communications networks can include or be a local area network (LAN), a wide area network (WAN), or a metropolitan area network (MAN) that facilitate communication among the computing devices. One or more direct communication links can be included between the computing devices. In addition, in some cases, the computing devices can be installed at geographically distributed locations. In other cases, the multiple computing devices can be installed at one geographic location, such as a server farm or an office.

As used herein, the terms "storage media" or "computer-readable storage media" can refer to non-transitory storage media, such as non-limiting examples of a hard drive, a memory chip, and cache memory, and to transitory storage media, such as carrier waves or propagating signals.

Aspects of the system for privacy exposure assessment can be implemented in various manners (e.g., as a method, a system, a computer program product, or one or more computer-readable storage media). Accordingly, aspects of the present disclosure can take the form of a hardware implementation, a software implementation (including firmware, resident software, or micro-code) or an implementation combining software and hardware aspects that can generally be referred to herein as a "circuit," "module" or "system." Functions described in this disclosure can be implemented as an algorithm executed by one or more hardware processing units, e.g., one or more microprocessors of one or more computers. In various implementations, different operations and portions of the operations of the algorithms described can be performed by different processing units. Furthermore, aspects of the present disclosure can take the form of a computer program product implemented in one or more computer-readable media having computer-readable program code implemented, e.g., encoded or stored, thereon. In various implementations, such a computer program can, for example, be downloaded (or updated) to existing devices and systems or be stored upon manufacture of these devices and systems.

The detailed description presents various descriptions of specific implementations. The innovations described can be implemented in a multitude of different ways, for example, as defined and covered by the claims and/or select examples. In the description, reference is made to the drawings where like reference numerals can indicate identical or functionally similar elements. Elements illustrated in the drawings are not necessarily drawn to scale. Additionally, particular implementations can include more elements than illustrated in a drawing and/or a subset of the elements illustrated in a drawing. Further, some implementations can incorporate a suitable combination of features from two or more drawings.

The disclosure describes various illustrative implementations and examples for implementing the features and functionality of the present disclosure. The components, arrangements, and/or features are described in connection with various implementations and are merely examples to simplify the present disclosure and are not intended to be limiting. In the development of actual implementations, implementation-specific decisions can be made to achieve the developer's goals, including compliance with system, business, and/or legal constraints, which vary from one implementation to another. Additionally, while such a development effort might be complex and time-consuming, it would be a routine undertaking for those of ordinary skill in the art having the benefit of this disclosure.

The systems, methods and devices of this disclosure have several innovative aspects, no one of which is solely responsible for the attributes disclosed herein. Some objects or advantages might not be achieved by implementations described herein. Thus, for example, certain implementations can operate in a manner that achieves or optimizes one advantage or group of advantages as taught herein and not other objects or advantages as taught or suggested herein.

In one example implementation, electrical circuits of the drawings can be implemented on a board of an electronic device. The board can be a general circuit board that can hold various components of the internal electronic system of the electronic device and, further, provide connectors for other peripherals. More specifically, the board can provide the electrical connections by which other components of the system can communicate electrically. Any processors (inclusive of digital signal processors, microprocessors, and supporting chipsets) and computer-readable memory elements can be coupled to the board based on configurations, processing demands, and computer designs. Other components such as external storage, additional sensors, controllers for audio/video display, and peripheral devices can be attached to the board as plug-in cards, via cables, or integrated into the board itself. In various implementations, the functionalities described herein can be implemented in emulation form as software or firmware running within one or more configurable (e.g., programmable) elements arranged in a structure that supports these functions. The software or firmware providing the emulation can be provided on one or more non-transitory, computer-readable storage media including instructions to allow one or more processors to carry out those functionalities.

In another example implementation, the electrical circuits of the drawings can be implemented as stand-alone modules (e.g., a device with associated components and circuitry configured to perform a specific application or function) or implemented as plug-in modules into application-specific hardware of electronic devices.

Implementations of the present disclosure can be readily included in a system-on-chip (SOC) package. An SOC represents an integrated circuit (IC) that integrates components of a computer or other electronic system into one chip. The SOC can contain digital, analog, mixed-signal, and radio frequency functions on one chip substrate. Other implementations can include a multi-chip-module (MCM) with a plurality of separate ICs located within one electronic package and that interact through the electronic package. In various other implementations, the processors can be implemented in one or more silicon cores in Application Specific Integrated Circuits (ASICs), Field Programmable Gate Arrays (FPGAs), a programmable logic array (PLA), programmable array logic (PAL), generic array logic (GAL), and other semiconductor chips.

The specifications, dimensions, and relationships outlined herein (e.g., the number of processors and logic operations) have been offered for non-limiting purposes of example and teaching. Such information can be varied considerably. For example, various modifications and changes can be made to arrangements of components. The description and drawings are, accordingly, to be regarded in an illustrative sense, not in a restrictive sense.

With the numerous examples provided herein, interaction was described in terms of two, three, four, or more electrical components for purposes of clarity and example. The system can be consolidated in any manner. Along similar design alternatives, the illustrated components, modules, and elements of the drawings can be combined in various possible configurations within the scope of this disclosure. In some cases, it is clearer to describe one or more of the functionalities of a given set of flows by referencing a reduced number of electrical elements. The electrical circuits of the drawings and their teachings are scalable and can accommodate additional components, as well as more complicated/sophisticated arrangements and configurations. Accordingly, the examples provided do not limit the scope or inhibit the teachings of the electrical circuits as potentially applied to a myriad of other architectures.

In this disclosure, references to various features (e.g., elements, structures, modules, components, steps, operations, characteristics, attributes, aspects, etc.) included in "at least one implementation," "example implementation," "select implementations," "another implementation," "some implementations," "various implementations," "other implementations," "multiple implementations," and the like are intended to mean that any such features are included in one or more implementations of the present disclosure and might not necessarily be combined in the same implementations. Some operations can be deleted or omitted where appropriate, or these operations can be modified or changed considerably. In addition, the timing of these operations can be altered considerably. The preceding operational flows have been offered for purposes of example and discussion. Implementations described herein provide flexibility in that any suitable arrangements, chronologies, configurations, and timing mechanisms can be provided.

EXAMPLES

In Example MA1, a method comprises receiving privacy information about an entity from a privacy resource; parsing the privacy information to identify a plurality of keywords; determining a plurality of attributes of a user requested by the entity, at least in part based on the plurality of keywords; and transmitting a result, at least in part based on the plurality of attributes.

Example MA2 is the method of Example MA1, wherein the parsing includes determining a highest granularity of one of the plurality of attributes, and the result identifies the highest granularity for the one of the plurality of attributes.

Example MA3 is the method of one of Examples MA1-MA2, wherein the parsing includes performing a natural language processing to extract the plurality of keywords from the privacy information.

Example MA4 is the method of one of Examples MA1-MA3, further comprising: receiving information identifying the entity, wherein the information identifying the entity is defined by an application package, a uniform resource locator (URL), a domain, or a name of the entity; and determining the privacy resource, at least in part based on the entity.

Example MA5 is the method of one of Examples MA1-MA4, wherein each of the plurality of attributes is defined by at least one of personal identifying information of the user, information about a digital asset of the user, information about the user's activity, or information about the user's location.

Example MA6 is the method of one of Examples MA1-MA5, further comprising: producing a common schema, at least in part based on the plurality of attributes, wherein the result is at least in part based on the common schema.

Example MA7 is the method of one of Examples MA1-MA6, further comprising: determining a jurisdiction of the entity, wherein the privacy resource is based at least in part on the jurisdiction.

In Example CA1, a non-transitory, computer-readable medium is encoded with executable instructions that, when executed by a processing unit, perform operations comprising: receiving privacy information about an entity from a privacy resource; parsing the privacy information to identify a plurality of keywords; determining a plurality of attributes of a user requested by the entity, at least in part based on the plurality of keywords; and transmitting a result, at least in part based on the plurality of attributes.

Example CA2 is the medium of Example CA1, wherein the parsing includes determining a highest granularity of one of the plurality of attributes, and the result identifies the highest granularity for the one of the plurality of attributes.

Example CA3 is the medium of one of Examples CA1-CA2, wherein the parsing includes performing a natural language processing to extract the plurality of keywords from the privacy information.

Example CA4 is the medium of one of Examples CA1-CA3, the operations further comprising: receiving information identifying the entity, wherein the information identifying the entity is defined by an application package, a uniform resource locator (URL), a domain, or a name of the entity; and determining the privacy resource, at least in part based on the entity.

Example CA5 is the medium of one of Examples CA1-CA4, wherein each of the plurality of attributes is defined by at least one of personal identifying information of the user, information about a digital asset of the user, information about the user's activity, or information about the user's location.

Example CA6 is the medium of one of Examples CA1-CA5, the operations further comprising: producing a common schema, at least in part based on the plurality of attributes, wherein the result is at least in part based on the common schema.

Example CA7 is the medium of one of Examples CA1-CAA6, the operations further comprising determining a jurisdiction of the entity, wherein the privacy resource is based at least in part on the jurisdiction.

In Example AA1, an apparatus comprises a network interface that receives privacy information about an entity from a privacy resource; and a processor configured to parse the privacy information to identify a plurality of keywords, and to determine a plurality of attributes of a user requested by the entity, at least in part based on the plurality of keywords, wherein the network interface transmits a result, at least in part based on the plurality of attributes.

Example AA2 is the apparatus of Example AA1, wherein the processor is configured to parse the privacy information by determining a highest granularity of one of the plurality of attributes, and the result identifies the highest granularity for the one of the plurality of attributes.

Example AA3 is the apparatus of one of Examples AA1-AA2, wherein the processor is configured to parse the privacy information by performing a natural language processing to extract the plurality of keywords from the privacy information.

Example AA4 is the apparatus of one of Examples AA1-AA3, wherein the network interface receives information identifying the entity, the information identifying the entity is defined by an application package, a uniform resource locator (URL), a domain, or a name of the entity, and the processor further is configured to determine the privacy resource, at least in part based on the entity.

Example AA5 is the apparatus of one of Examples AA1-AA4, wherein each of the plurality of attributes is defined by at least one of personal identifying information of the user, information about a digital asset of the user, information about the user's activity, or information about the user's location.

Example AA6 is the apparatus of one of Examples AA1-AA5, wherein the processor further is configured to produce a common schema, at least in part based on the plurality of attributes, and the result is at least in part based on the common schema.

Example AA7 is the apparatus of one of Examples AA1-AA6, wherein the processor further is configured to determine a jurisdiction of the entity, and the privacy resource is based at least in part on the jurisdiction.

In Example MB1, a method comprises receiving privacy information about an entity from a privacy resource; parsing the privacy information into a plurality of attributes of a user; calculating a privacy exposure index, at least in part based on each of the plurality of attributes; and transmitting the privacy exposure index.

Example MB2 is the method of Example MB1, wherein each of the plurality of attributes is defined by at least one of personal identifying information of the user, information about a digital asset of the user, information about the user's activity, or information about the user's location.

Example MB3 is the method of Example MB2, further comprising: determining an aspect of one of the plurality of attributes, wherein the aspect is defined by at least one of an attribute risk group, a granularity of the attribute, a risk implication of the attribute, an immutability of the attribute, a sensitivity of the attribute, a purpose of the entity for attribute, whether the attribute is mandatory for the entity, or whether the attribute is expected for the entity, and the privacy exposure index is calculated at least in part based on the aspect.

Example MB4 is the method of Example MB3, further comprising: calculating an exposure index risk contributor, at least in part based on the aspect, wherein the exposure index risk contributor is defined by at least one of an attribute score of the attribute, the attribute risk group, an attribute risk multiplier, a context multiplier, or a confidence level of a source of the privacy information, and the privacy exposure index is calculated, at least in part based on the exposure index risk contributor.

Example MB5 is the method of Example MB4, wherein the privacy exposure index is defined by $$\Sigma_{Attributes} \text{risk group} \times \text{attribute} \times \text{attribute risk multiplier} \times \text{context multiplier} \times \text{confidence},$$

where, for each attribute of the plurality of attributes, risk group is the risk group score for the attribute, attribute score is the attribute score of the attribute, attribute risk multiplier is a product of the granularity, the risk implication, the immutability, and the sensitivity of the attribute, context multiplier is a product of the purpose, requisiteness score of whether the attribute is mandatory for the entity, and a score of whether the attribute is expected for a business category of the entity, and confidence is the confidence score of the attribute.

Example MB6 is the method of one of Examples MB1-MB5, further comprising: determining an increased risk based on a combination of the plurality of attributes, wherein the privacy exposure index is at least in part based on the increased risk.

Example MB7 is the method of one of Examples MB1-MB6, further comprising: receiving information identifying the entity, wherein the information identifying the entity is defined by an application package, a uniform resource locator (URL), a domain, or a name of the entity; and determining the privacy resource, at least in part based on the entity.

In Example CB1, a non-transitory, computer-readable medium is encoded with executable instructions that, when executed by a processing unit, perform operations comprising: receiving privacy information about an entity from a privacy resource; parsing the privacy information into a plurality of attributes of a user; calculating a privacy exposure index, at least in part based on each of the plurality of attributes; and transmitting the privacy exposure index.

Example CB2 is the medium of Example CB1, wherein each of the plurality of attributes is defined by at least one of personal identifying information of the user, information about a digital asset of the user, information about the user's activity, or information about the user's location.

Example CB3 is the medium of Example CB2, the operations further comprising: determining an aspect of one of the plurality of attributes, wherein the aspect is defined by at least one of an attribute risk group, a granularity of the attribute, a risk implication of the attribute, an immutability of the attribute, a sensitivity of the attribute, a purpose of the entity for attribute, whether the attribute is mandatory for the entity, or whether the attribute is expected for the entity, and the privacy exposure index is calculated at least in part based on the aspect.

Example CB4 is the medium of Example CB3, the operations further comprising: calculating an exposure index risk contributor, at least in part based on the aspect, wherein the exposure index risk contributor is defined by at least one of an attribute score of the attribute, the attribute risk group, an attribute risk multiplier, a context multiplier, or a confidence level of a source of the privacy information, and the privacy exposure index is calculated, at least in part based on the exposure index risk contributor.

Example CB5 is the medium of Example CB4, wherein the privacy exposure index is defined by $$\Sigma_{Attributes} \text{risk group} \times \text{attribute} \times \text{attribute risk multiplier} \times \text{context multiplier} \times \text{confidence},$$

where, for each attribute of the plurality of attributes, risk group is the risk group score for the attribute, attribute score is the attribute score of the attribute, attribute risk multiplier is a product of the granularity, the risk implication, the immutability, and the sensitivity of the attribute, context multiplier is a product of the purpose, requisiteness score of whether the attribute is mandatory for the entity, and a score of whether the attribute is expected for a business category of the entity, and confidence is the confidence score of the attribute.

Example CB6 is the medium of one of Examples CB1-CB5, the operations further comprising: determining an increased risk based on a combination of the plurality of attributes, wherein the privacy exposure index is at least in part based on the increased risk.

Example CB7 is the medium of one of Examples CB1-CB6, the operations further comprising: receiving information identifying the entity, wherein the information identifying the entity is defined by an application package, a uniform resource locator (URL), a domain, or a name of the entity; and determining the privacy resource, at least in part based on the entity.

In Example AB1, an apparatus comprises a network interface that receives privacy information about an entity from a privacy resource; and a processor configured to parse the privacy information into a plurality of attributes of a user and to calculate a privacy exposure index, at least in part based on each of the plurality of attributes, wherein the network interface transmits the privacy exposure index.

Example AB2 is the apparatus of Example AB1, wherein each of the plurality of attributes is defined by at least one of personal identifying information of the user, information about a digital asset of the user, information about the user's activity, or information about the user's location.

Example AB3 is the apparatus of Example AB2, wherein the processor further is configured to determine an aspect of one of the plurality of attributes, the aspect is defined by at least one of an attribute risk group, a granularity of the attribute, a risk implication of the attribute, an immutability of the attribute, a sensitivity of the attribute, a purpose of the entity for attribute, whether the attribute is mandatory for the entity, or whether the attribute is expected for the entity, and the privacy exposure index is calculated at least in part based on the aspect.

Example AB4 is the apparatus of Example AB3, wherein the processor further is configured to calculate an exposure index risk contributor, at least in part based on the aspect, the exposure index risk contributor is defined by at least one of an attribute score of the attribute, the attribute risk group, an attribute risk multiplier, a context multiplier, or a confidence level of a source of the privacy information, and the privacy exposure index is calculated, at least in part based on the exposure index risk contributor.

Example AB5 is the apparatus of Example AB4, wherein the privacy exposure index is defined by $$\Sigma_{Attributes} \text{ risk group} \times \text{attribute} \times \text{attribute risk multiplier} \times \text{context multiplier} \times \text{confidence},$$

where, for each attribute of the plurality of attributes, risk group is the risk group score for the attribute, attribute score is the attribute score of the attribute, attribute risk multiplier is a product of the granularity, the risk implication, the immutability, and the sensitivity of the attribute, context multiplier is a product of the purpose, requisiteness score of whether the attribute is mandatory for the entity, and a score of whether the attribute is expected for a business category of the entity, and confidence is the confidence score of the attribute.

Example AB6 is the apparatus of one of Examples AB1-AB5, wherein the processor further is configured to determine an increased risk based on a combination of the plurality of attributes, and the privacy exposure index is at least in part based on the increased risk.

Example AB7 is the apparatus of one of Examples AB1-AB6, wherein the network interface receives information identifying the entity, the information identifying the entity is defined by an application package, a uniform resource locator (URL), a domain, or a name of the entity, and the processor further is configured to determine the privacy resource, at least in part based on the entity.

Some additional Examples combine the features of Examples MA1-MA7 and MB1-MB7, CA1-CA7 and CB1-CB7, and AA1-AA7 and AB1-AB7.

We claim:

1. A method, comprising:
   receiving privacy information about an entity from a privacy resource;
   parsing the privacy information to identify a plurality of keywords;
   determining a plurality of attributes of a user requested by the entity, at least in part based on the plurality of keywords;
   producing a common schema, at least in part based on the plurality of attributes, wherein the common schema defines whether at least one of the plurality of attributes is mandatory for the entity; and
   transmitting a result, at least in part based on whether the at least one of the plurality of attributes is mandatory for the entity.

2. The method of claim 1, wherein the parsing includes determining a highest granularity of one of the plurality of attributes, and the result identifies the highest granularity for the one of the plurality of attributes.

3. The method of claim 1, wherein the parsing includes performing a natural language processing to extract the plurality of keywords from the privacy information.

4. The method of claim 1, further comprising:
   receiving information identifying the entity, wherein the information identifying the entity is defined by an application package, a uniform resource locator (URL), a domain, or a name of the entity; and
   determining the privacy resource, at least in part based on the entity.

5. The method of claim 1, wherein each of the plurality of attributes is defined by at least one of personal identifying information of the user, information about a digital asset of the user, information about the user's activity, or information about the user's location.

6. The method of claim 1, further comprising:
   determining a jurisdiction of the entity, wherein the privacy resource is based at least in part on the jurisdiction.

7. A non-transitory, computer-readable medium encoded with executable instructions that, when executed by a processing unit, perform operations comprising:
   receiving privacy information about an entity from a privacy resource;
   parsing the privacy information to identify a plurality of keywords;
   determining a plurality of attributes of a user requested by the entity, at least in part based on the plurality of keywords;
   producing a common schema, at least in part based on the plurality of attributes, wherein the common schema defines whether at least one of the plurality of attributes is mandatory for the entity; and
   transmitting a result, at least in part based on whether the at least one of the plurality of attributes is mandatory for the entity.

8. The medium of claim 7, wherein the parsing includes determining a highest granularity of one of the plurality of attributes, and the result identifies the highest granularity for the one of the plurality of attributes.

9. The medium of claim 7, wherein the parsing includes performing a natural language processing to extract the plurality of keywords from the privacy information.

10. The medium of claim 7, the operations further comprising:
receiving information identifying the entity, wherein the information identifying the entity is defined by an application package, a uniform resource locator (URL), a domain, or a name of the entity; and
determining the privacy resource, at least in part based on the entity.

11. The medium of claim 7, wherein each of the plurality of attributes is defined by at least one of personal identifying information of the user, information about a digital asset of the user, information about the user's activity, or information about the user's location.

12. An apparatus, comprising:
a memory configured to store instructions;
a network interface that receives privacy information about an entity from a privacy resource; and
a processor coupled to the memory and configured to execute the instructions to parse the privacy information to identify a plurality of keywords, to determine a plurality of attributes of a user requested by the entity, at least in part based on the plurality of keywords, and to produce a common schema, at least in part based on the plurality of attributes, wherein the common schema defines whether at least one of the plurality of attributes is mandatory for the entity, and
the network interface transmits a result, at least in part based on whether the at least one of the plurality of attributes is mandatory for the entity.

13. The apparatus of claim 12, wherein the processor is configured to parse the privacy information by determining a highest granularity of one of the plurality of attributes, and the result identifies the highest granularity for the one of the plurality of attributes.

14. The apparatus of claim 12, wherein the processor is configured to parse the privacy information by performing a natural language processing to extract the plurality of keywords from the privacy information.

15. The apparatus of claim 12, wherein the network interface receives information identifying the entity, the information identifying the entity is defined by an application package, a uniform resource locator (URL), a domain, or a name of the entity, and the processor further is configured to determine the privacy resource, at least in part based on the entity.

16. The apparatus of claim 12, wherein each of the plurality of attributes is defined by at least one of personal identifying information of the user, information about a digital asset of the user, information about the user's activity, or information about the user's location.

17. The apparatus of claim 12, wherein the processor further is configured to determine a jurisdiction of the entity, and the privacy resource is based at least in part on the jurisdiction.

* * * * *